US008457945B1

(12) United States Patent
Fielder et al.

(10) Patent No.: US 8,457,945 B1
(45) Date of Patent: Jun. 4, 2013

(54) PROCESSOR-IN-THE-LOOP CO-SIMULATION OF A MODEL

(75) Inventors: Jonathan Fielder, Cambridgeshire (GB); David MacLay, Cambridge (GB)

(73) Assignee: The Mathworks, Inc., Natick, MA (US)

( * ) Notice: Subject to any disclaimer, the term of this patent is extended or adjusted under 35 U.S.C. 154(b) by 0 days.

(21) Appl. No.: 13/478,864

(22) Filed: May 23, 2012

Related U.S. Application Data

(63) Continuation of application No. 12/167,643, filed on Jul. 3, 2008, now Pat. No. 8,209,158.

(51) Int. Cl.
G06F 9/45 (2006.01)
(52) U.S. Cl.
USPC .......................................................... 703/22
(58) Field of Classification Search
USPC ........ 703/1, 2, 13, 14, 21–23, 26, 27; 714/30; 717/106; 716/1; 369/30.21; 708/200; 700/17; 719/328; 713/156; 370/392
See application file for complete search history.

(56) References Cited

U.S. PATENT DOCUMENTS

| | | | | |
|---|---|---|---|---|
| 7,310,338 | B1 * | 12/2007 | Foltan et al. ................... | 370/392 |
| 7,490,032 | B1 | 2/2009 | Koh et al. | |
| 2002/0032559 | A1 * | 3/2002 | Hellestrand et al. ............ | 703/22 |
| 2002/0072893 | A1 * | 6/2002 | Wilson ............................ | 703/26 |
| 2002/0188434 | A1 * | 12/2002 | Shulman et al. ................ | 703/21 |
| 2005/0071145 | A1 * | 3/2005 | Sakiyama ........................ | 703/19 |
| 2005/0165597 | A1 * | 7/2005 | Nightingale .................... | 703/27 |
| 2005/0183097 | A1 * | 8/2005 | Carter et al. .................... | 719/328 |
| 2005/0216248 | A1 * | 9/2005 | Ciolfi et al. ...................... | 703/22 |
| 2006/0117274 | A1 * | 6/2006 | Tseng et al. ...................... | 716/1 |
| 2006/0200795 | A1 * | 9/2006 | MacLay .......................... | 717/106 |
| 2006/0271822 | A1 * | 11/2006 | Pal et al. ........................... | 714/30 |
| 2006/0282233 | A1 * | 12/2006 | Pasricha et al. ................... | 703/1 |
| 2006/0282247 | A1 * | 12/2006 | Brennan et al. ................. | 703/13 |
| 2007/0135933 | A1 * | 6/2007 | Panesse et al. .................. | 700/17 |
| 2007/0143096 | A1 * | 6/2007 | Brunet et al. .................... | 703/23 |
| 2007/0162531 | A1 * | 7/2007 | Kota .............................. | 708/200 |
| 2008/0059739 | A1 | 3/2008 | Ciolfi et al. | |
| 2008/0256358 | A1 * | 10/2008 | Wilkie et al. ................. | 713/156 |
| 2008/0319730 | A1 * | 12/2008 | Clark et al. ...................... | 703/19 |
| 2009/0012754 | A1 * | 1/2009 | Mosterman et al. ............. | 703/2 |
| 2009/0013322 | A1 | 1/2009 | MacLay | |
| 2009/0037163 | A1 * | 2/2009 | Kong et al. ...................... | 703/21 |
| 2009/0059739 | A1 * | 3/2009 | Cas et al. .................... | 369/30.21 |

OTHER PUBLICATIONS

U.S. Appl. No. 12/167,643, filed Jul. 3, 2008 entitled "Processor-in-the-Loop Co-Stimulation of a Model" by Jonathan Fielder et al., 53 pages.

LabVIEW® Tutorial Manual, National Instruments Corporation, pp. 1-250, (Jan. 1996 Edition).

* cited by examiner

Primary Examiner — Kandasamy Thangavelu
(74) Attorney, Agent, or Firm — Harrity & Harrity, LLP

(57) ABSTRACT

A model may be constructed and simulated using processor-in-the-loop co-simulation at a target device. In one implementation, a host environment may provide a graphical environment that facilitates construction of the model defined as a plurality of functional blocks. The host environment may receive, via graphical selection menus associated with the blocks of the model, an indication of which blocks of the model are to be simulated at an external target device and which blocks of the model are to be simulated at the host environment. Further, the host environment may receive a command, that may be entered interactively by a user, to start simulation of the model and execute, in response to the command, co-simulation of the model at the host environment and the external target device.

44 Claims, 13 Drawing Sheets

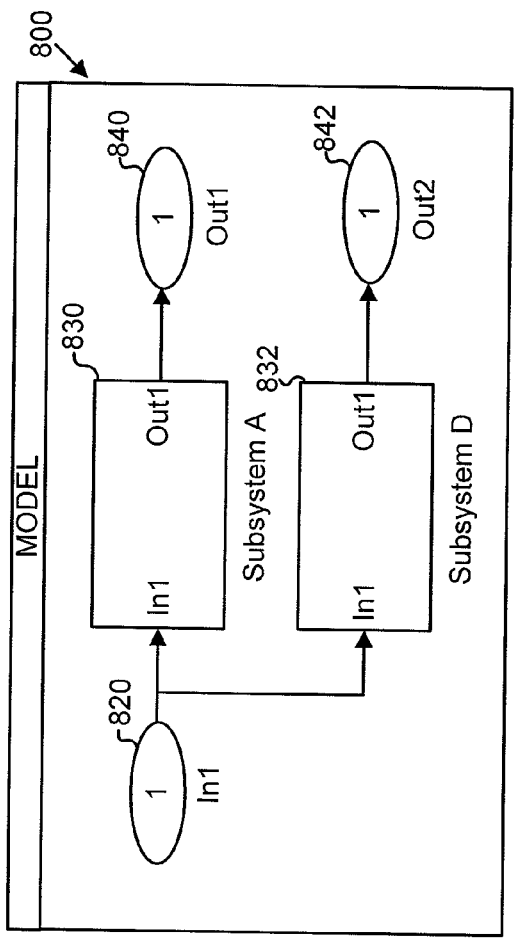
FIG. 8A
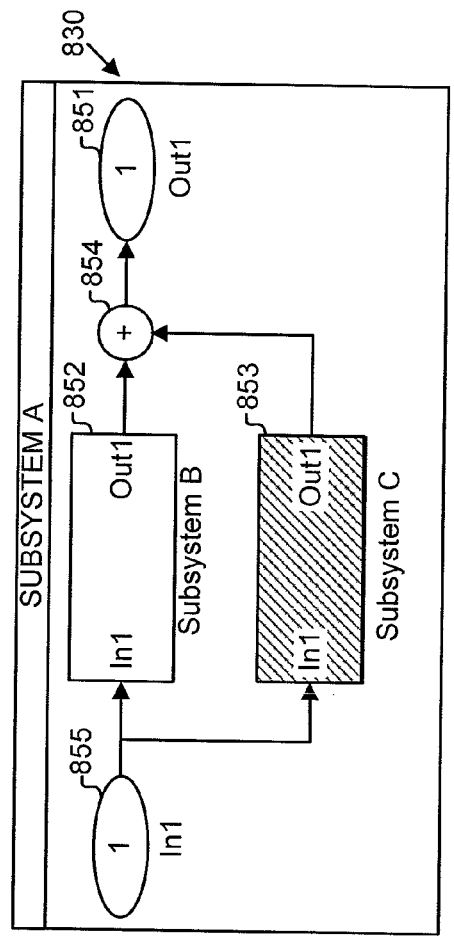
FIG. 8B
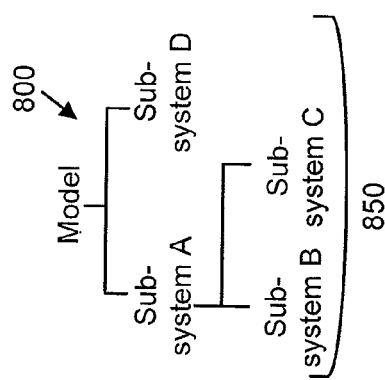

PROCESSOR-IN-THE-LOOP CO-SIMULATION OF A MODEL

RELATED APPLICATION

This application is a continuation of U.S. patent application Ser. No. 12/167,643, filed Jul. 3, 2008, the disclosure of which is incorporated by reference herein in its entirety.

BACKGROUND

Technical computing environments are known that present a user, such as a scientist or engineer, with an environment that enables efficient analysis and generation of technical applications. In the MATLAB® technical computing environment, for example, users may perform advanced analyses, visualize data, and develop algorithms. Ideally, a technical computing environment will enable a technical researcher or designer to efficiently and quickly perform tasks such as research and product development.

Existing technical computing environments may be implemented as or run in conjunction with a graphically-based environment. For example, in one existing graphically-based technical computing environment, models may be built by connecting graphical blocks, where each block may represent an object associated with functionality and/or data. Blocks may be hierarchical in the sense that each block itself may be implemented as one or more blocks. A user may, for instance, view the model at a high level, then select blocks to drill down into the model to see increasing levels of model detail.

Frequently, the model is designed and tested through the technical computing environment executing on a general purpose computer. The target system for the model, however, may be another device, such as a specialized processor running in an embedded system. For example, a user may design a model to control a station in an assembly line, where the station (referred to as the target device for the model) may include a number of external sensors and a microprocessor.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 8A and 8B are diagrams illustrating a model constructed in a hierarchical manner;

DETAILED DESCRIPTION

Figure 1:
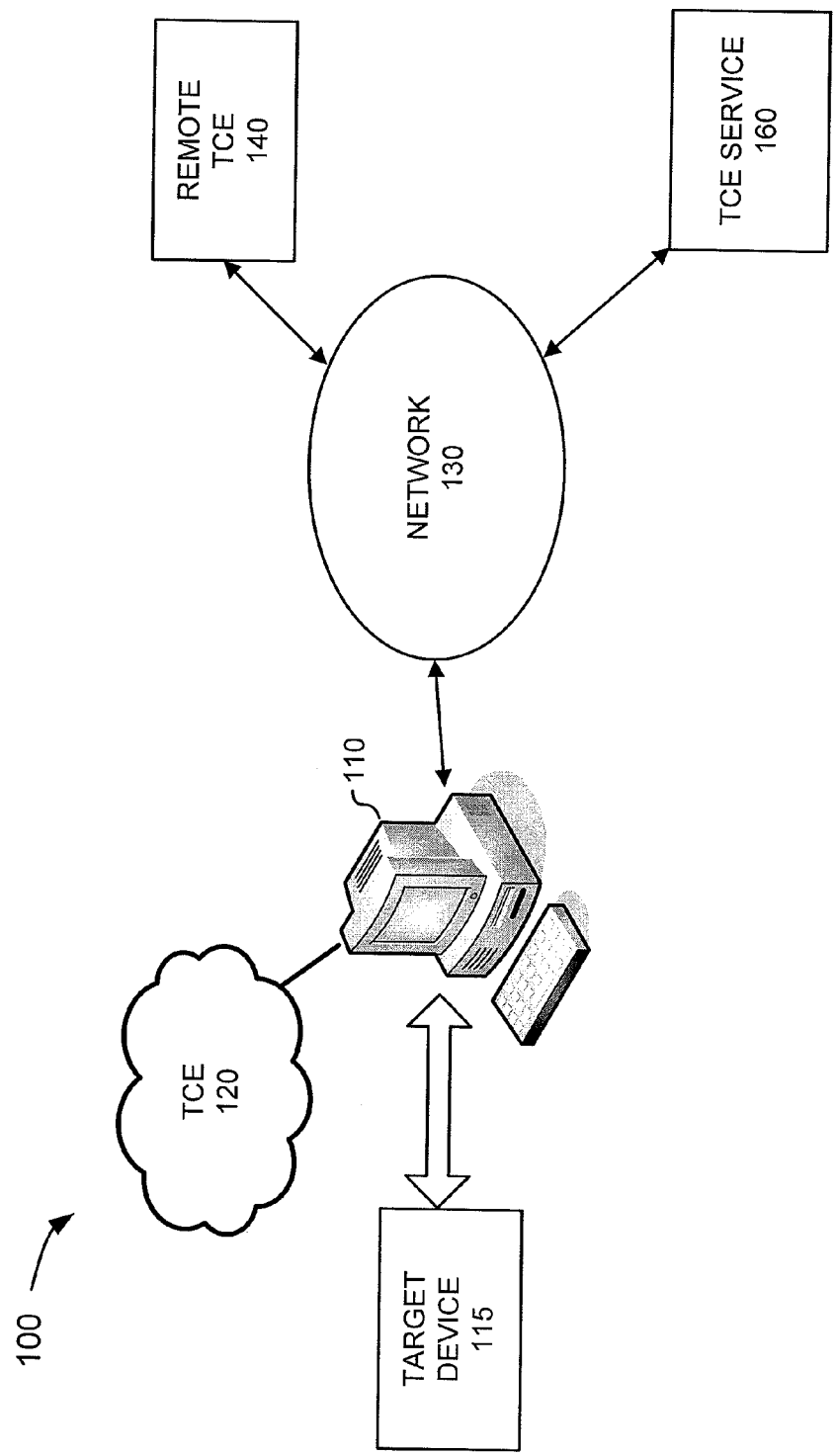
FIG. 1 is an exemplary diagram of a system in which concepts described herein may be implemented.

The following detailed description refers to the accompanying drawings. The same reference numbers in different drawings may identify the same or similar elements. Also, the following detailed description does not limit the invention.

Overview

Users may simulate execution of a model by running the model in a technical computing environment executing on a general purpose computer. Sometimes, however, the user may desire that parts of the model be directly executed on a target device. This may be desirable, for example, to acquire on-target performance data for performance reasons or to verify that the model works correctly on the target device. In this situation, the technical computing environment may enable co-simulation of the model, where co-simulation refers to the fact that the model is being simulated (tested) on both the target device and the remainder of the model on the host device (i.e., the general purpose computer at which the technical computing environment is executed).

Implementations described herein relate to a technical computing environment in which users may construct and test graphical models. The models may be defined by a plurality of blocks, potentially at different hierarchical levels in the model, that each define functionality of the model. Users may individually select, through a simple graphical menu, whether each block should be simulated in a host environment or at a target device via processor-in-the-loop (PIL) co-simulation. Additionally, in some implementations, a modular application programming interface (API) may be provided to allow configuration of co-simulation with the target device. The different modular API components may be independently combinable to create a complete interface with the target device.

DEFINITIONS

A "technical computing environment," as the term is used herein, is to be broadly interpreted to include any hardware and/or software based logic that provides a computing environment that allows users to efficiently perform tasks related to disciplines, such as, but not limited to, mathematics, science, engineering, medicine, business, etc. In one implementation, a technical computing environment may include a dynamically-typed programming language (e.g., the M language) that can be used to express problems and/or solutions in mathematical notations. For example, a technical computing environment may use an array as a basic element, where the array may not require dimensioning. In addition, a technical computing environment may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A technical computing environment may further provide mathematical functions and/or graphical tools or blocks (e.g., for creating plots, surfaces, images, volumetric representations, etc.). In one implementation, a technical computing environment may provide these functions and/or tools using toolboxes (e.g., toolboxes for signal processing, image processing, data plotting, parallel processing, etc.). In another implementation, a technical computing environment may provide these functions as block sets. In still another implementation, a technical computing environment may provide these functions in another way, such as via a library, etc.

A technical computing environment may be implemented as a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow® software, SimEvents™ software, etc., by The MathWorks, Inc.; VisSim by Visual Solutions; LabViewt by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

System Description

FIG. 1 is an exemplary diagram of a system 100 in which concepts described herein may be implemented. The system may include a personal computer or workstation 110. Workstation 110 may execute a technical computing environment (TCE) 120 that presents a user with an interface that enables efficient analysis and generation of technical applications. For example, TCE 120 may provide a numerical and/or symbolic computing environment that allows for matrix manipulation, plotting of functions and data, implementation of algorithms, creation of user interfaces, and/or interfacing with programs in other languages.

Workstation 110 may operate as a single detached computing device. Alternatively, workstation 110 may be connected to a network 130, such as a local area network (LAN) or wide area network (WAN) such as the Internet. When workstation 110 is connected to a network, TCE 120 may be run by multiple networked computing devices or by one or more remote computing devices. In such an implementation, TCE 120 may be executed in a distributed manner, such as by executing on multiple computing devices simultaneously. Additionally, in some implementations, TCE 120 may be executed over a network 130 in a client-server relationship. For example, workstation 110 may act as a client that communicates with, using a web browser, a server that stores and potentially executes TCE 120.

For example, as shown in FIG. 1, system 100 may include a remote TCE 140 (e.g., a remotely located computing device running a TCE) and/or a TCE service 160. TCE service 160 may include a server computing device that provides a TCE as a remote service. For instance, a TCE may be provided as a web service. The web service may provide access to one or more programs (e.g., TCE) provided by TCE service 160. A "web service," as the term is used herein, is to be broadly interpreted to include any software application that allows machine-to-machine communications over a network (e.g., a local area network (LAN), a metropolitan area network (MAN), a wide area network (WAN), such as the Internet, etc.). For example, a web service may communicate with a client (e.g., workstation 110) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

As used herein, TCE 120 and the computing hardware on which it operates, such as workstation 110, the computing hardware associated with remote TCE 140, or the computing hardware associated with TCE service 160, may be referred to as the "host environment."

System 100 may additionally include target device 115. Target device 115 may include, for example, a target computing device such as a specialized processor running in an embedded system. In other implementations, target device 115 may be a virtual target device, such as an instruction set simulator that implements the interface of the target device. Models constructed with TCE 120 may be designed to run, at least partially, at target device 115. In particular, when simulating or testing the model via the host environment, the user may desire to have target device 115 execute one or more portions, referred to as "blocks" herein, of the model. As described in more detail below, TCE 120 may provide for processor-in-the-loop (PIL) co-simulation in which selected blocks of a model may be easily and automatically executed at target device 115 while other portions of the model are executed by TCE 120. Results of the model blocks executing at target device 115 may be received by TCE 120 and presented to the user.

Target device 115 and the host environment may be connected to one another in a number of different ways. For example, target device 115 may be connected to the host environment via a wired connection, such as over a network or via a direct connection. Alternatively, target device 115 may be connected to the host environment via a wireless link or network connection. Additionally, in some implementations, target device 115 and the host environment may be contained within a single physical housing or enclosure, such as if target device 115 was a processor embedded in a circuit board or card that is designed to be inserted into a personal computer.

Figure 2:
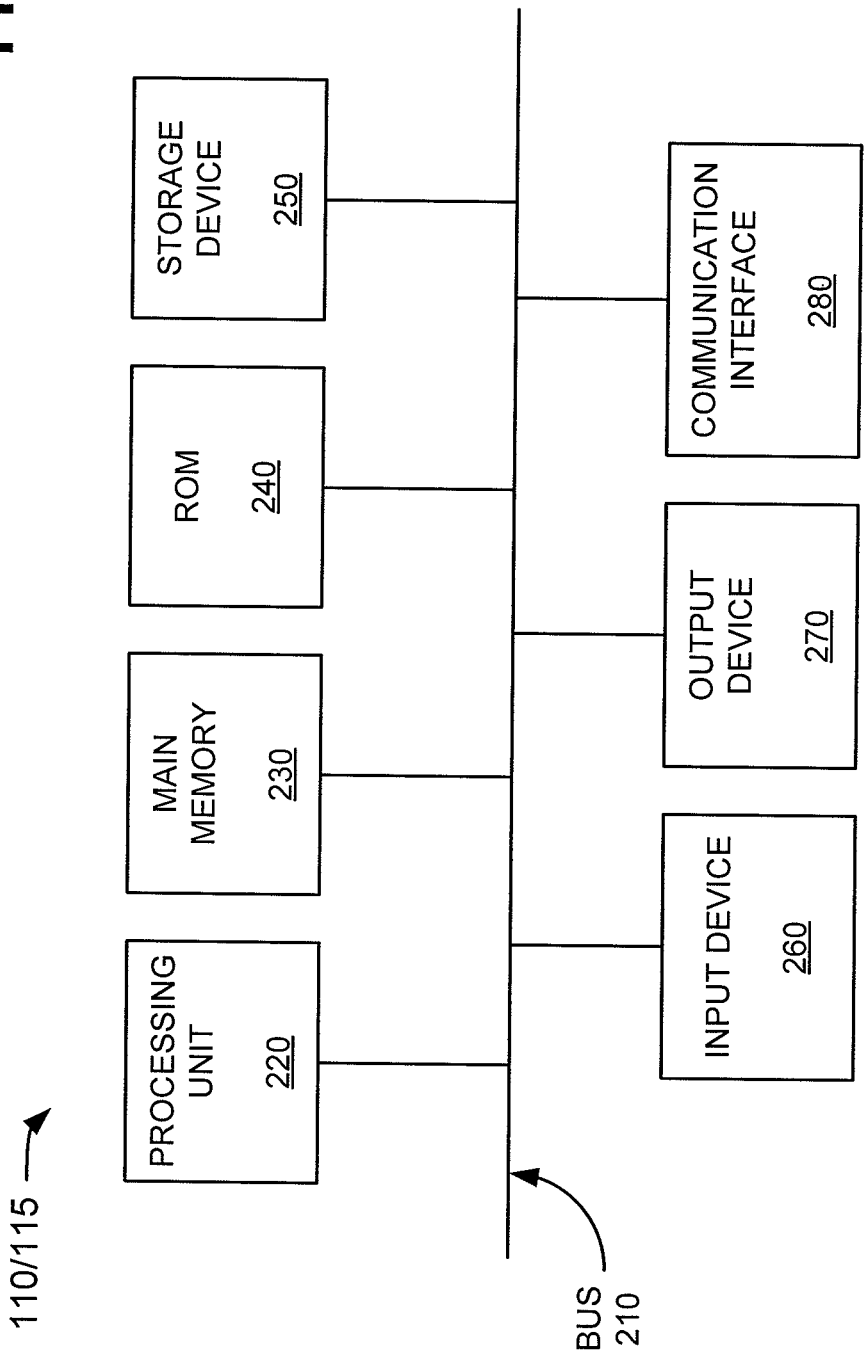
FIG. 2 is a diagram of an exemplary device corresponding to a computing device shown in FIG. 1.

FIG. 2 is a diagram of an exemplary device corresponding to a computing device, such as workstation 110 or target device 115. As illustrated, workstation 110 may include a bus 210, a processing device 220, a main memory 230, a read-only memory (ROM) 240, a storage device 250, an input device 260, an output device 270, and/or a communication interface 280. Bus 210 may include a path that permits communication among the components of workstation 110.

Processing device 220 may include a processor, microprocessor, or other types of processing logic that may interpret and execute instructions. Processing device 220 may include a single core or multi-core processing device. With a multi-core processing device, in one possible implementation, TCE 120 may execute on one core of the multi-core processing device and target device 115 may be implemented by or simulated by another core of the multi-core processing device. Main memory 230 may include a random access memory (RAM) or another type of dynamic storage device that may store information and instructions for execution by processing device 220. ROM 240 may include a ROM device or another type of static storage device that may store static information and/or instructions for use by processing device 220. Storage device 250 may include a magnetic and/or optical recording medium and its corresponding drive.

Input device 260 may include a mechanism that permits an operator to input information, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables computing device 110/115 to communicate with other devices and/or systems. For example, communication interface 280 may include mechanisms for communicating with another device or system via a network.

As will be described in detail below, computing device 110/115 may perform certain operations in response to processing unit 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

The computer-readable medium of workstation 110 may particularly include TCE 120. TCE 120 may include any of the features defined above with respect to the term "technical computing environment." For example, in one implementation, the technical computing environment may include MATLAB® software that provides a variety of mathematical functions and/or graphical tools.

Although FIG. 2 shows exemplary components of computing device 110/115, in other implementations, computing device 110/115 may contain fewer, different, or additional components than depicted in FIG. 2. In still other implementations, one or more components of computing device 110/115 may perform one or more tasks performed by one or more other components of computing device 110/115.

Technical Computing Environment

Figure 3:
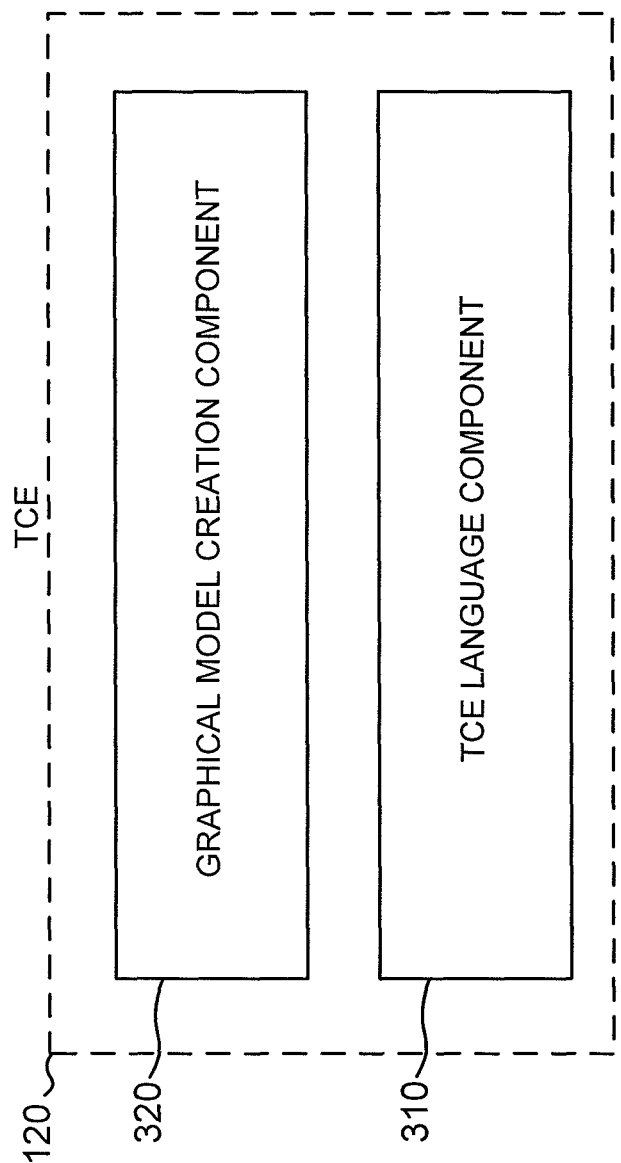
FIG. 3 is a diagram illustrating functional components of a technical computing environment (TCE)

FIG. 3 is a diagram illustrating functional components of TCE 120. As mentioned, TCE 120 may include a program stored on a computer-readable medium, such as main memory 230 or ROM 240 in workstation 110. In other implementations, TCE 120 may be associated with another device separate from workstation 110, and may be accessed by workstation 110 via communication interface 280 and a network. In yet other implementations, all or part of TCE 120 may be implemented in hardware.

TCE 120 may include a TCE language component 310 and a graphical model creation component 320. TCE language component 310 may generally function to implement a technical computing language. TCE language component 310 may, for example, provide an interface that integrates computation, visualization, and programming in a relatively easy-to-use environment where problems and solutions can be expressed in mathematical notation familiar to technical users.

Graphical model creation component 320 may include software for modeling, simulating, and/or analyzing dynamic systems. Graphical model creation component 320 may, for instance, support linear and nonlinear systems, models in continuous time, sampled time, or a hybrid of the two. Systems modeled with graphical model creation component 320 may be constructed using a graphical interface that allows the user to arrange blocks that represent functionality and/or data. Graphical model creation component 320 may additionally allow users to execute or run the created model and to view and analyze results of the model.

In general, graphical model creation component 320 can be used to graphically generate models that represent a behavior of a design or system. The models may be used to facilitate communication, peer-review, and iterative refinement with visual representations that simplify understanding. The graphical models may eventually be compiled and deployed in an external target system, such as target device 115.

As described herein, TCE 120 may be implemented by logic that provides for the simulation of a created model in which one or more portions of the model may be run at target device 115 using a processor-in-the-loop (PIL) co-simulation mode. This can be useful in a number of situations, such as when a user would like to verify that a model that is designed to run on a target device will run on the target device without errors.

Before describing model co-simulation in additional detail, it will be helpful to describe an exemplary model generated with graphical model creation component 320.

Figure 4:
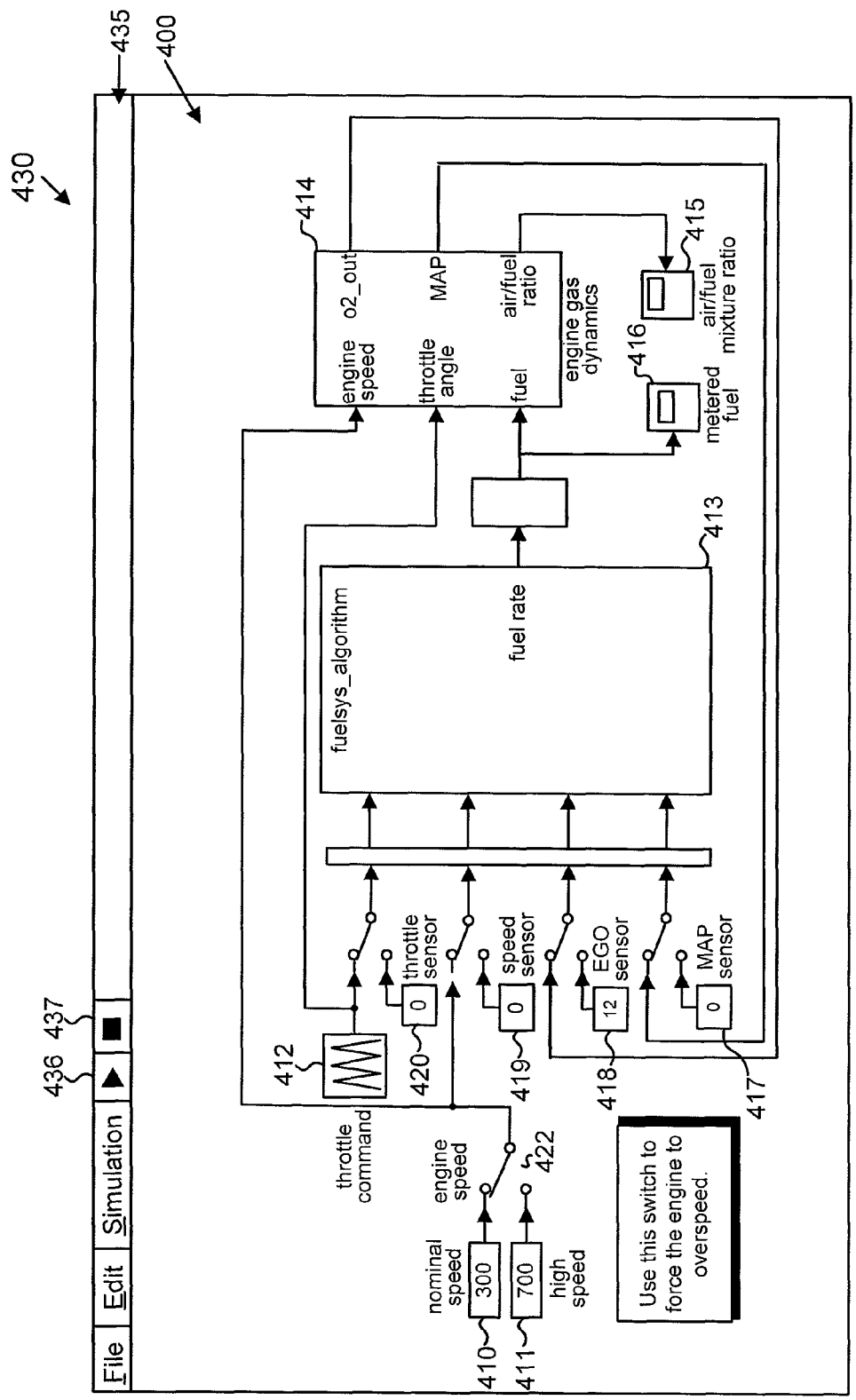
FIG. 4 is a diagram illustrating an exemplary graphical interface in which a model may be generated.

FIG. 4 is a diagram illustrating an exemplary model 400 created with graphical model creation component 320. Model 400 may be constructed from a number of graphical blocks 410-420, as shown in FIG. 4. Each block 410-420 may represent functionality that is to be implemented in the model. Blocks may be graphically placed in model 400 by the user from block libraries, where each block in a block library may be a block designed by the manufacturer of TCE 120, a third party, or the user of TCE 120.

A "block" as this term is used herein, generally refers to a portion of functionality that may be used in a model. Although blocks will be generally described herein as functionality for a model that is graphically represented, it can be appreciated that a block does not necessarily need to be represented graphically. Also, the particular visual depiction used to represent a block is generally an arbitrary design choice.

Model 400 is shown as a model representing a control system for an aircraft. Blocks 410 ("nominal speed") and 411 ("high speed") represent constants that define the engine speed of the aircraft. Switch 422 may be settable by the user and may allow the tested engine speed to be set based on block 410 or block 411.

Model 400 additionally includes a number of signal input blocks, labeled as blocks 412 and 417-420. Block 412 is labeled as a throttle command block, and may be configured to generate a command simulating a throttle signal. In a production, deployed version of model 400, block 412 may represent an actual throttle signal from the aircraft. Blocks 417-420 similarly represent additional signals that may be generated by various sensors in the aircraft. More particularly, these blocks include: MAP sensor block 417, EGO sensor block 418, speed sensor block 419, and throttle sensor block 420.

Blocks 413 and 414 are labeled as "fuelsys_algorithm" and "engine gas dynamics" respectively and may represent model functionality related to determining fuel rate and other engine parameters. Block 413, for instance, may receive an input signal from throttle command block 412, MAP sensor block 417, EGO sensor block 418, speed sensor block 419, throttle sensor block 420, and a signal from nominal speed block 410 or high speed block 411. In response, block 413 may calculate a signal representing the engine's fuel rate.

Block 415 ("air/fuel mixture ratio") and block 416 ("metered fuel") may represent probe blocks. These blocks may, for instance, allow a user (e.g., the designer) of model 400 to view various signals in the model as the model is simulating. In model 400, block 416 may allow the user to view the "fuel rate" signal output from block 413, and block 415 may allow the designer to view the "air/flow ratio" signal output from block 414.

The user may interact with model 400 through one or more graphical windows 430. Graphical window 430 may provide an interface through which commands relating to model 400 can be entered. For example, graphical window 430 may display a toolbar 435 that includes a "run" button 436 and a "stop/pause" button 437. Run button 436 may cause TCE 120 to begin simulating the model. That is, TCE 120 may execute the functionality associated with each block in the model in an order using input signals dictated by the connectivity of the blocks. Stop/pause button 437 may stop an ongoing simulation.

Model Co-Simulation

At some point, a user that is designing a model may wish to simulate or run the model in order to test the model. When simulating the model via TCE 120, the user may view the state of various signals in the model, such as via blocks 415 and 416 in model 400. Additionally, the user may define simulated test signals in place of signals that eventually will emanate from a physical sensor, such as the signals for blocks 417-420 in model 400. Additionally, portions of the model may be executed at a device or process external to the host environment, such as target device 115. When executing portions of the model at target device 115, the target device may transmit information describing the results of the simulation back to TCE 120, which may, for instance, then propagate the signals to other blocks in the model. In this manner, the simulation of the model can be performed at both TCE 120 and target device 115. This type of simulation, called processor-in-the-loop (PIL) co-simulation herein, can be advantageous when testing various portions of a model on a target device to, for example, ensure that the model functions properly on the target device.

Figure 5:
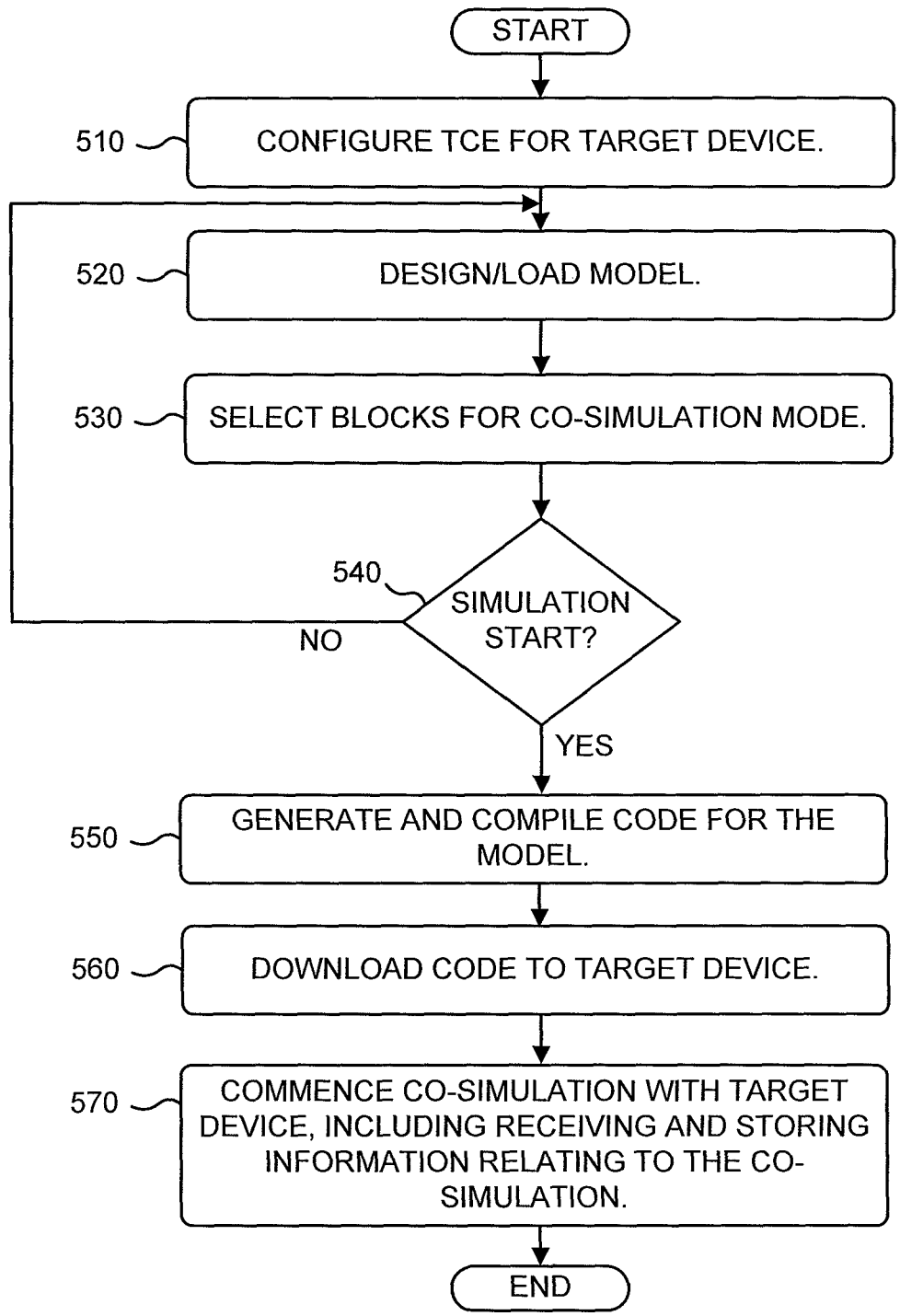
FIG. 5 is a flow chart illustrating exemplary operations for performing co-simulation of a model.

FIG. 5 is a flow chart illustrating exemplary operations for performing PIL co-simulation of a model.

The user may initially configure TCE 120 for the target device (block 510). This may be a one-time operation in which TCE 120, once configured for target device 115, may not need to be re-configured. The configuration may be performed using, for example, a connectivity application programming interface (API) used to facilitate connectivity between TCE 120 and target device 115. The connectivity API may include a number of modular components that are each independently programmable. For example, the API may include a "builder" component used to configure how TCE 120 and target device 115 handle building of a model, a "launcher" component used to configure how TCE 120 launches a model on target device 115, and a "communicator" component used to configure how TCE 120 and target device 115 communicate. The connectivity API will be described in more detail below.

The user may design a model and provide the model to (or load a previously designed model into) TCE 120 (block 520). The model, such as model 400, may be designed using graphical model creation component 320 and may be based on one or more graphical blocks that each define functionality of the model. It can be appreciated that the concepts described herein are not limited to any particular model design environment.

At some point, the user may designate certain blocks in the model as blocks that, during simulation, are to be simulated in co-simulation mode (block 530). In one implementation, an arbitrary set of blocks may be selected by the user for co-simulation using a simple graphical interface. For example, a user may select a block in some manner, such as by selecting and "right-clicking" on a block, to bring up a context menu that allows the user to select how the block is to be simulated.

Figure 6:
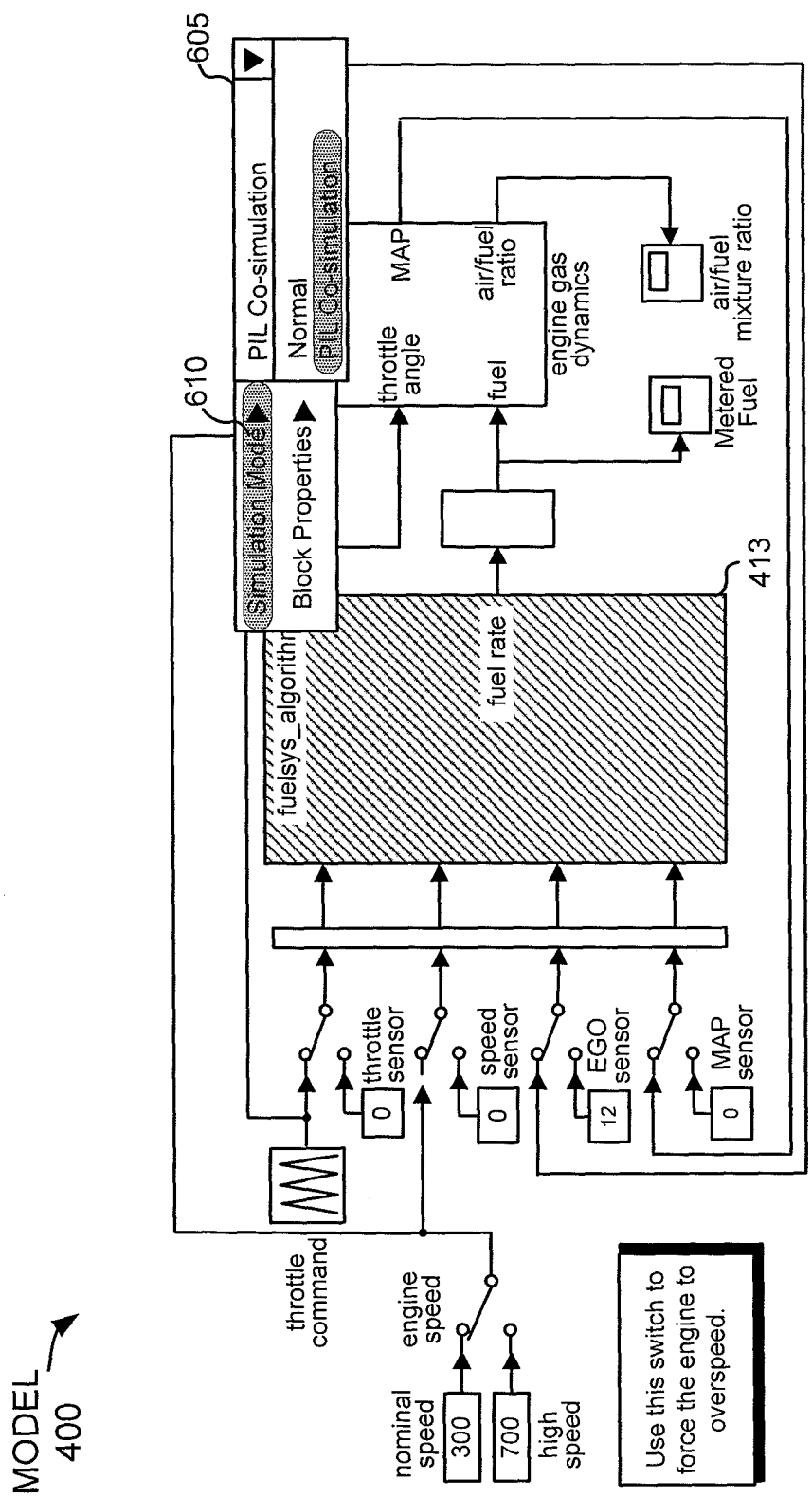
FIG. 6 is a diagram illustrating an exemplary graphical interface for selecting a co-simulation mode for a model.

FIG. 6 is a diagram illustrating an exemplary interface for selecting the simulation mode for a block. As shown in FIG. 6, the user has selected block 413 in model 400, which may cause TCE 120 to display context menu 605. The user may, for example, have selected context menu 605 for block 413 by "right-clicking" with the user's mouse. In this example, context menu 605 includes an option 610 to select the simulation mode for the block. The user may then select, via a drop-down menu, whether the simulation mode is to be "normal" mode (i.e., simulation entirely by TCE 120) or PIL co-simulation. In this example, the user has selected "PIL co-simulation," indicating that during simulation, block 413 is to be executed at target device 115. Graphical model creation component 320 may, in some implementations, visually indicate (or indicate in some other manner) that a block is selected for PIL co-simulation, such as by showing the block in a different style or by distinctively shading the block. Block 413, for instance, includes cross-hatch shading. Other visual indicators that a block is selected, such as a different font for the block, could also be used. Further, in some implementations, blocks selected for PIL co-simulation may be presented to the user in a non-graphical manner, such as by printing out a textual list.

In alternate implementations, option 610, for selecting the simulation mode for the block, instead of being shown directly in the graphical window in which the block is shown, may be displayed in a graphical view separate from the view in which the block is displayed.

Referring back to FIG. 5, at some point, the user may desire to start the simulation of the model (block 540). The user may, for example, press run button 436 (FIG. 4) to initiate execution of the model. At this point, TCE 120 may begin to simulate the model, as further described below with respect to blocks 550, 560, and 570. TCE 120 may begin simulating the model, using co-simulation for the selected blocks (if any), without any further configuration or interaction by the user. From the user's perspective, performing a PIL co-simulation may involve selection of the blocks to co-simulate and starting the simulation.

TCE 120 may generate and compile (build) code for the model (block 550). The code may be, for example, computer code in a language such as C, C++, or another language that is then compiled. In some implementations, portions of a model that were previously compiled and that have not changed since the previous compile may not need to be recompiled. In some implementations, code generated or compiled for portions of the model that is to be simulated on target device 115 may be generated differently based on features and capabilities of target device 115. Configuration information for generating and/or building code specific to the target device may be configured via a "build" component of the connectivity API. For example, an external compiler to use for the target device or other features of the code generation and build process may be configured via the connectivity API.

Figure 7:
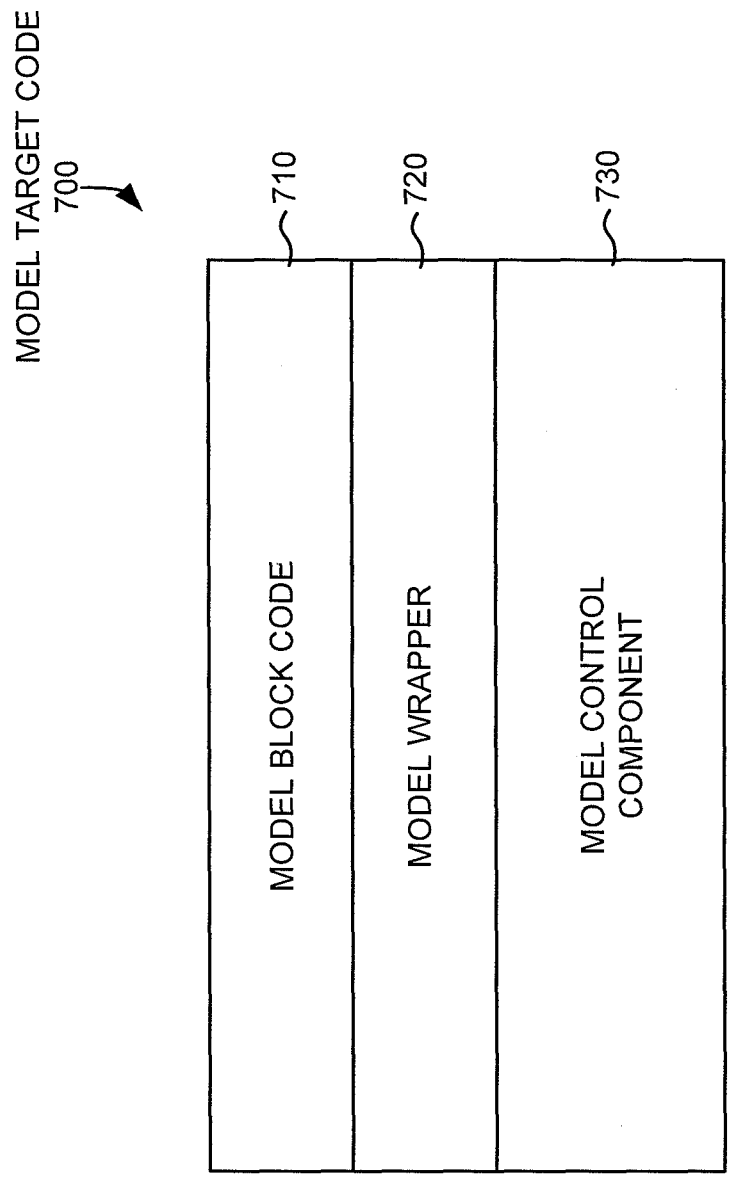
FIG. 7 is a diagram illustrating exemplary software concepts for executing a model at a target device.

FIG. 7 is a diagram illustrating exemplary software components, labeled as model target code 700, that may implement the model generated for target device 115 (FIG. 5, block 550). Model target code 700 may be compiled for target device 115 and may represent the portions of model 400 selected for execution on target device 115, and may include model block code 710, model wrapper 720, and model control component 730.

Model block code 710 may include code that implements the functionality of the various blocks designated by the user as blocks that are to execute at target device 115. Model wrapper 720 may provide an interface for the functions in model block code 710. In other words, model wrapper 720 may invoke the various functions in model block code 710, pass data to these functions, and receive results back from the functions. Model control component 730 may, via model wrapper code 720, control the execution of the basic model functions provided by model block code 710. Model control component 730 may additionally handle communications with TCE 120. Thus, model control component 730 may receive timing and model information from TCE 120 and provide the results of model block code to TCE 120. Model control component 730 may include device drivers, such as Transmission Control Protocol/Internet Protocol (TCP/IP) or serial communication drivers for communicating with TCE 120.

Referring back to FIG. 5, TCE 120 may download the generated and compiled code to target device 115 (block 560). In other words, TCE 120 may download model target code 700 to TCE 115. TCE 120 may then commence PIL co-simulation with target device 115 (block 570). During co-simulation, results of the model simulation at both TCE 120 and target device 115 may be received, stored, and/or displayed by TCE 120.

Models designed with TCE 120 may be represented in a hierarchical manner. For instance, a block may be defined based on multiple other blocks. This allows a designer to design a complex model based on a number of less complex modular components. PIL co-simulation may be performed at an arbitrary level of the model hierarchy.

FIGS. 8A and 8B are diagrams illustrating a model 800 constructed in a hierarchical manner. In the example of FIG. 8A, model 800 represents a model having an input block 820 ("In1") connected to subsystem block 830 ("Subsystem A") and subsystem block 832 ("Subsystem D"), which generate outputs to output block 840 ("Out1") or output block 842 ("Out2"). Subsystems A 830 and/or D 832 may include a number of additional functional blocks or subsystems. For exemplary model 800, hierarchical layout 850 illustrates a hierarchy of subsystems that make up model 800. As shown, model 800 includes subsystems A and D. Subsystem A further includes subsystems B and C.

Blocks 820, 830, 832, 840, and 842 may represent elements from which model 800 is built. Model 800 may have been generated by a user placing each of blocks 820, 830, 832, 840, and 842 in a graphical interface, connecting inputs and outputs of the blocks to create logical connections between the blocks, and configuring parameters relating to the blocks. Subsystem A 830, in particular, may have been generated by the user grouping, through graphical model creation component 320, blocks into sets of blocks as a subsystem.

FIG. 8B is a diagram of subsystem A 830 of model 800. Subsystem A 830 includes an input block 855 ("In1") and an output block 851 ("Out1"). Additionally, subsystem A 830 includes two additional subsystems: subsystem B 852 and subsystem C 853. The output of subsystem B 852 and subsystem C 853 are summed by sum block 854 before being sent to output block 851.

In FIG. 8B, assume a user has selected subsystem C 853 as a block that is to be simulated at target device 115. Subsystem C 853 may be shown in a visually distinctive manner, such as by cross-hatch shading, to indicate that that this block has been selected for PIL co-simulation. TCE 120, when generating model block code 710 for this model, may generate model block code 710 to embody the functionality of subsystem C 853, including the functionality defined by all blocks below subsystem C 853 in the model hierarchy. At some point, the user may select another or an additional block to include in the PIL co-simulation. For instance, the user may select subsystem B 852 to include in the PIL co-simulation. In this situation, model block code 710 may be generated to include the functionality embodied by both subsystem B 852 and subsystem C 853, as well as the functionality of all blocks below these blocks in the model hierarchy.

In some implementations, blocks in addition to blocks that were explicitly selected by the user for co-simulation at target device 115, may be automatically selected by TCE 120 for co-simulation at target device 115. For instance, the user's selection of certain blocks in the model for co-simulation at target device 115 may dictate that other blocks, such as certain blocks below the selected blocks in the model hierarchy, need to also be simulated at target device 115.

In some implementations, target device 115 may support, as well as multiple blocks, execution of multiple instances of a block. Control of the different instances of a block and of the different blocks may be provided by model control component 730.

Figure 9:
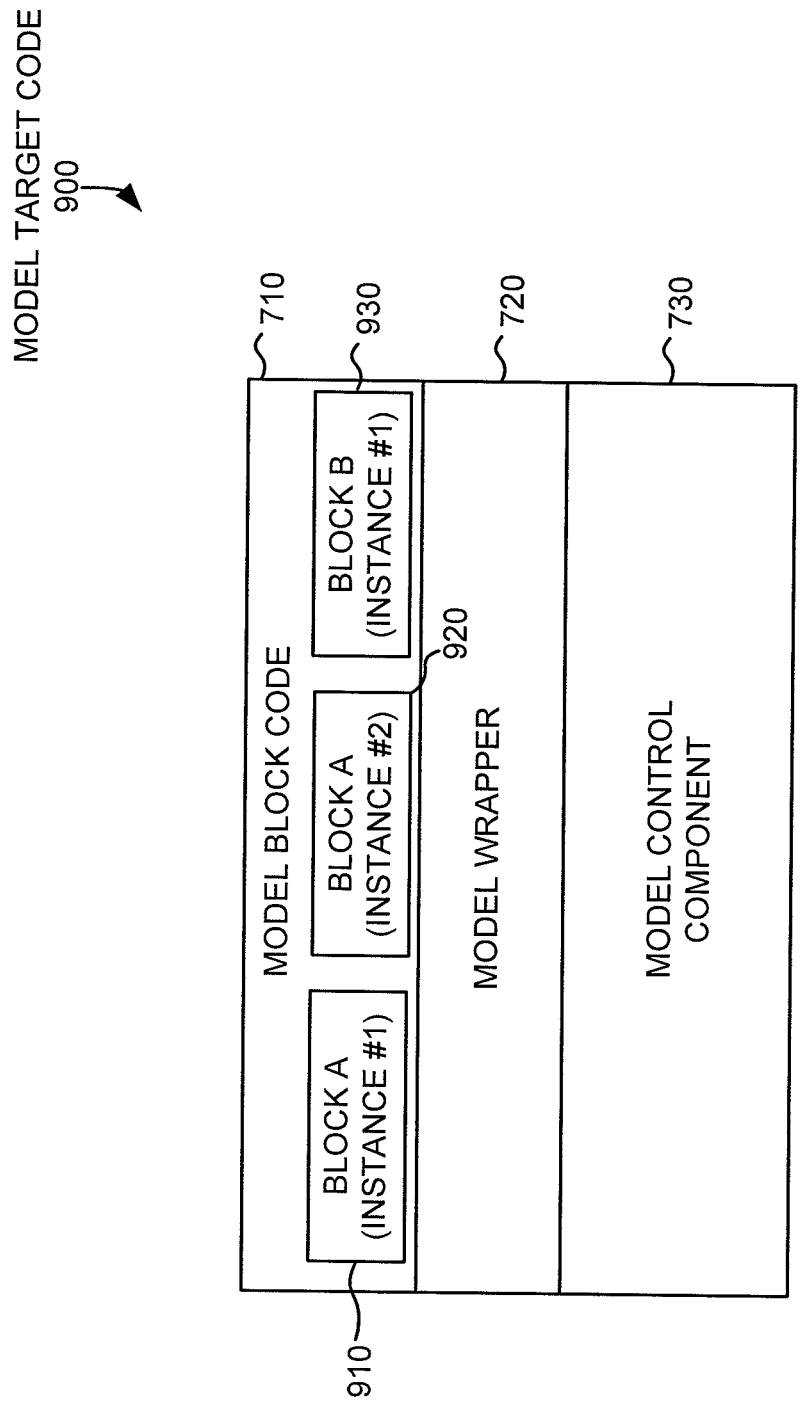
FIG. 9 is a diagram illustrating an exemplary implementation of model target code that includes, during a simulation, multiple instances of a block.

FIG. 9 is a diagram illustrating an exemplary implementation of model target code 900 that includes, during a simulation, multiple instances of a block. As with model target code 700 (FIG. 7), model target code 900 may include model block code 710, model wrapper 720, and model control component 730. In this example, model block code 710 is particularly shown as including block A (instance #1) 910, block A (instance #2) 920, and block B (instance #1) 930. Blocks 910, 920, and 930 may represent run-time instances of blocks of the model, as created by model target code 900. Multiple instances (e.g., block A instance #1 910 and block A instance #2 920) of the same block may be simultaneously created by model target code 900. This can be useful, for example, in a model in which a block is re-used at different places in the model hierarchy. Further, as is shown in FIG. 9, model control component 730 may control model block code 710 to simultaneously maintain multiple instances of different blocks, such as block A 910 and/or 920 and block B 930.

In some implementations, multiple separate instances of the simulation environment may be supported at a single target device 115. With such an architecture, multiple models may be simultaneously simulated on a target device.

Figure 10:
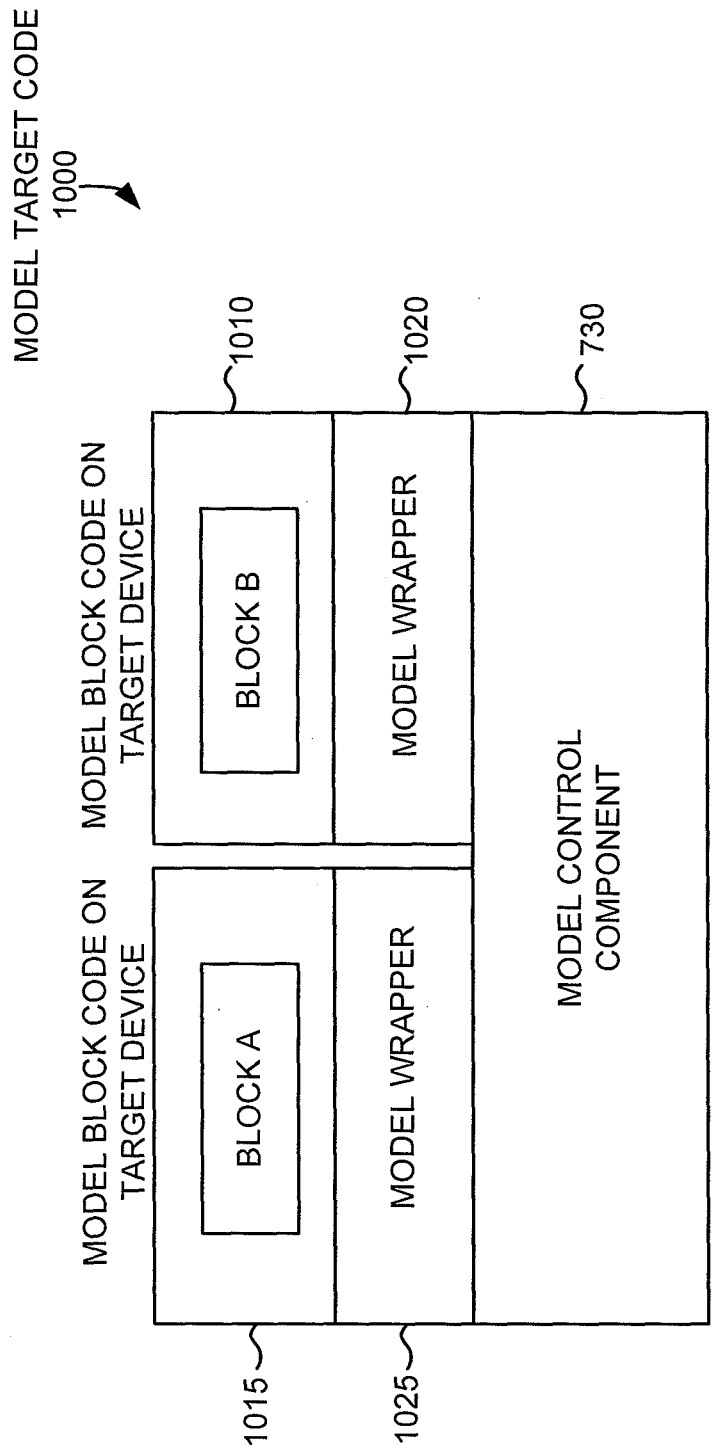
FIG. 10 is a diagram illustrating an exemplary implementation of model target code that includes, during a simulation, multiple instances of a simulation environment.

FIG. 10 is a diagram illustrating an exemplary implementation of model target code 100 that includes, during a simulation, multiple instances of a simulation environment. As with model target code 700 (FIG. 7), model target code 1000 may include model control component 730. Model control component 730 may interact with two different instances of the model wrapper and two different instances of the model block code, shown as model block code 1010/model wrapper 1020 and model block code 1015/model wrapper 1025. Each instance may define a separate simulation environment. In FIG. 10, one of the simulation environments is executing a block labeled "block A" while the other is executing a block labeled "block B." In general, each simulation environment could potentially execute a different model. It can be appreciated that although two simulation environments are shown in FIG. 10, in general, more than two simulation environments could be implemented.

As previously mentioned, information pertaining to model simulation on target device 115 may be received by TCE 120. This information may be presented to the user in some manner. In one implementation, information relating to status of the co-simulation or to results of the simulation may be presented to the user as information annotating model 400.

Figure 11:
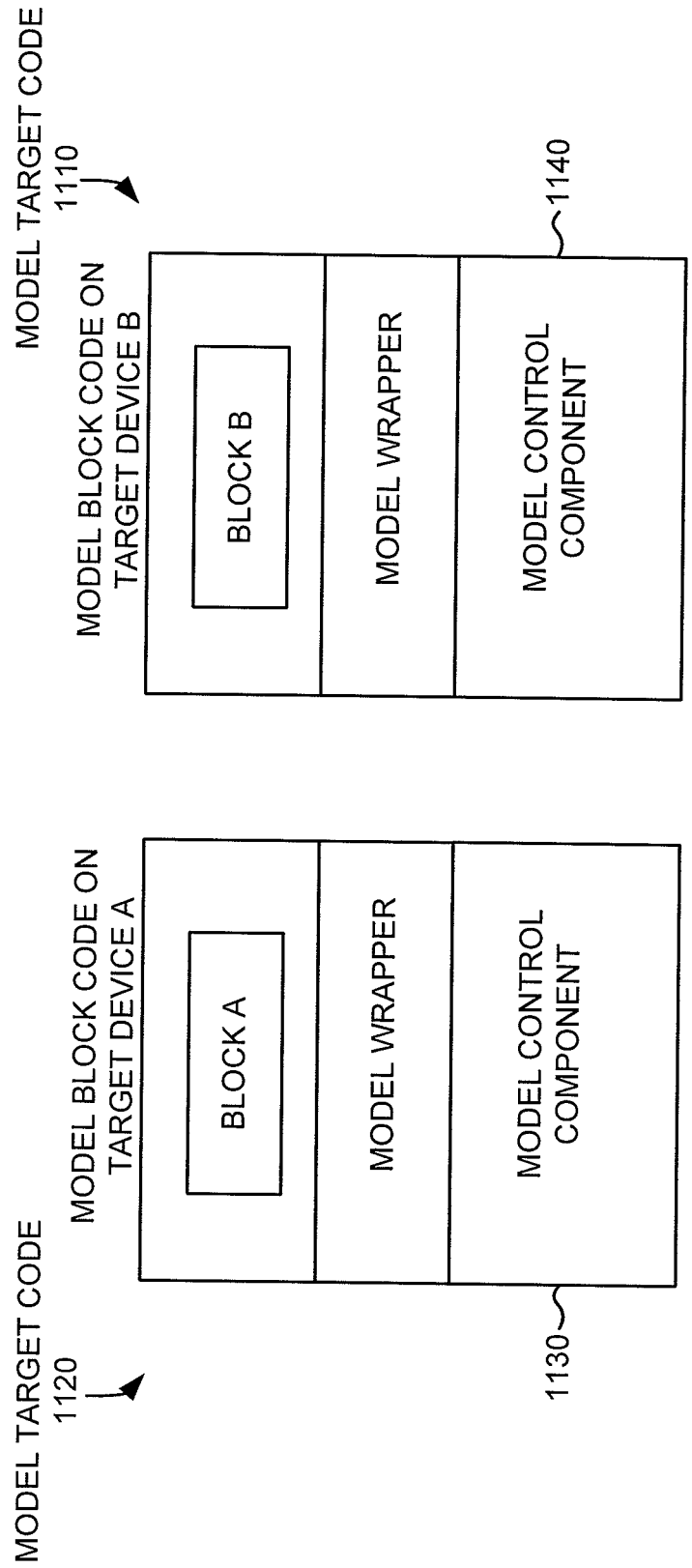
FIG. 11 is a diagram illustrating an exemplary implementation in which model target code instances execute on multiple target devices.

FIG. 11 is a diagram illustrating an exemplary implementation in which model target code instances execute on multiple target devices. In this implementation, a model may be simulated by multiple target devices. For example, one or more blocks in a model may be executed in PIL co-simulation mode at a first target device (target device "A") while other blocks of the model may be simultaneously executed in PIL co-simulation mode at a second target device (target device "B"). Model control components 1130 and 1140 in the target devices may communicate with TCE 120, which may then control simulation of the model. Accordingly, the model may be "co-simulated" at multiple devices, i.e., TCE 120 and multiple target devices.

From the point of view of the target devices, PIL co-simulation is essentially identical to the implementation shown in FIG. 9. That is, each target device implements one or more blocks of the model. Using multiple target devices in this manner may be useful, for example, to increase model simulation speed or in situations in which the deployed version of the model is to be distributed over multiple target devices.

Figure 12:
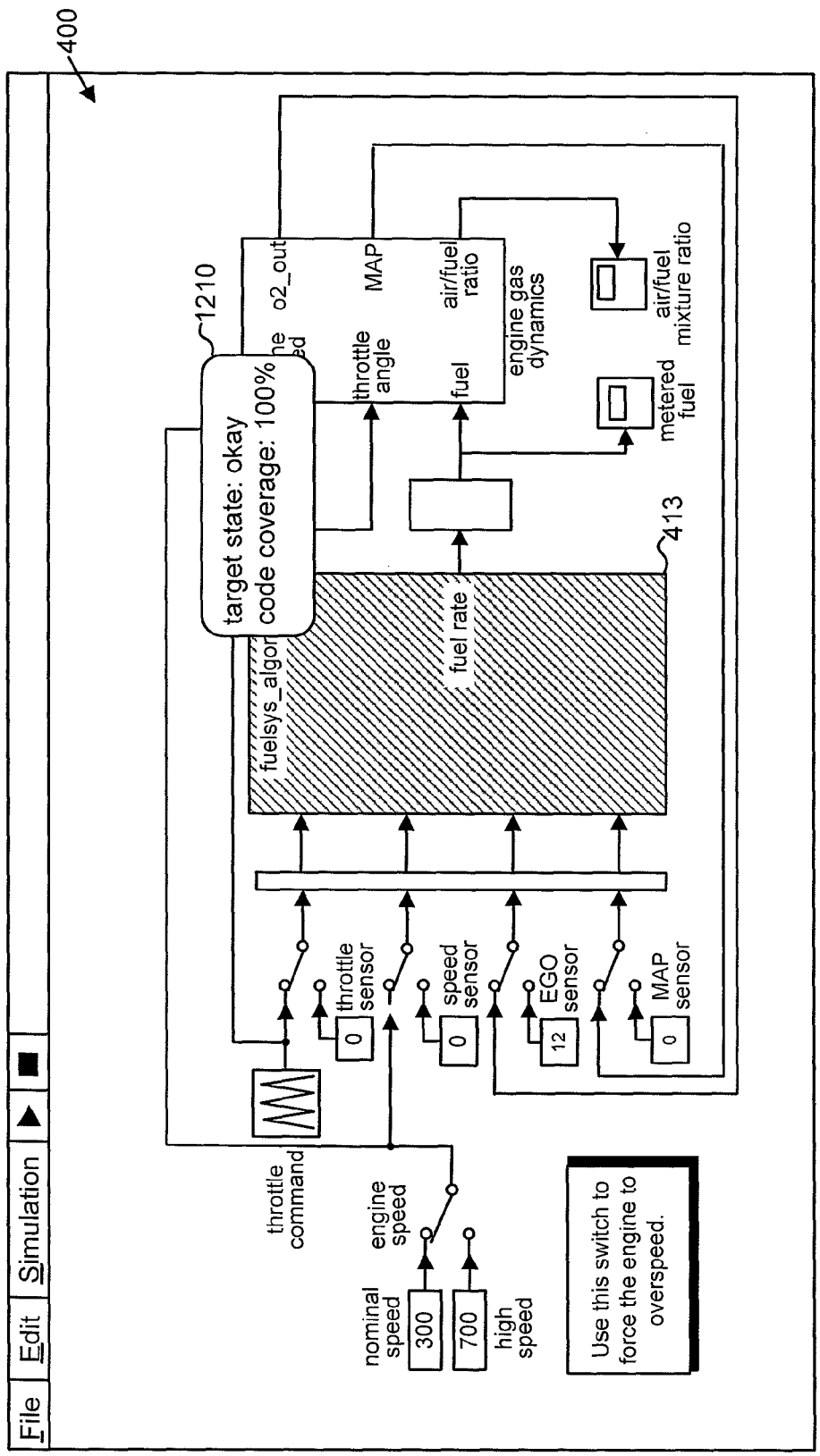
FIG. 12 is a diagram illustrating exemplary annotation information presented on a graphical view of a model.

FIG. 12 is a diagram illustrating exemplary annotation information presented on a graphical view of a model. In this example, a graphical box 1210 is shown associated with block 413 of model 400. Graphical box 1210 may be presented to a user in response to, for example, the user "mousing over" block 413 or selecting block 413 and then selecting to view annotation information relating to the co-simulation for block 413 (such as via a "right-click" context menu or via a pull-down menu selection). In some implementations, instead of displaying graphical box 1210 associated with annotation information for a particular model block, graphical box 1210 may show information relating to the entire model.

Graphical box 1210 may display a number of different types of information to the user. For example, graphical box 1210 may display metrics relating to the status of an ongoing or completed co-simulation, such as code coverage metrics, execution profile information, or stack profile information. Additionally or alternatively, graphical box 1210 may display information relating to co-simulation configuration information, such as a device type or status (e.g., running, halted, etc.) of target device 115 or the state of the communication link to target device 115.

In the example shown in FIG. 12, graphical box 1210 is particularly shown as displaying information relating to the status of the target device ("okay") and code coverage information for block 413.

In some implementations, TCE 120 may present information relating to the state of various blocks that are being simulated via PIL co-simulation at target device 115. As previously mentioned, model control component 730 of target device 115 may communicate with TCE 120. TCE 120 may receive and store information relating to the state of blocks being simulated at target device 115. State information relating to blocks being simulated at target device 115 may be displayed to the user in a number of ways. For instance, a user may add one or more blocks to a model that are designed to display variables or signals in the model. Alternatively, graphical boxes, such as graphical box 1210, that display state information relating to a block may present block state information to the user.

In some implementations, TCE 120 may allow the state of blocks that are to be simulated at target device 115 to be set to a desired state. For instance, the model, when compiled and downloaded to the target device (FIG. 5, block 560), may be compiled and downloaded with variables or other properties of the model blocks set to an initial predetermined state. In this manner, a model may be immediately set to a desired state. Alternatively, the user may desire that a model execute in non-PIL co-simulation mode until a certain state or time is reached and then, at that point, the model may switch to PIL co-simulation mode. Accordingly, TCE 120 may provide an option through which the user may specify a condition at which PIL co-simulation mode is to start. For example, the user may specify that when certain model variables have certain values or after a certain model time has elapsed, TCE 120 should begin PIL co-simulation. Prior to this point, the model may be simulated entirely at TCE 120. After this point, TCE 120 may simulate the model in PIL co-simulation mode with target device 115.

In some implementations, TCE 120 may allow the user to modify or tune parameters relating to the operation of blocks that are being simulated at target device 115. The user may, for example, select a block to modify parameters relating to the block. TCE 120 may transmit the updated values for the parameters to model control component 730 in target device 115. Model control component 730 may then update model block code 710 to reflect the changed parameter values.

As previously discussed, a connectivity API may be used to initially facilitate connectivity between TCE 120 and target device 115. The connectivity API may include a number of modular components that are each independently programmable. The modular nature of the connectivity API can facilitate component reuse and lead to reduced development effort.

Figure 13A:
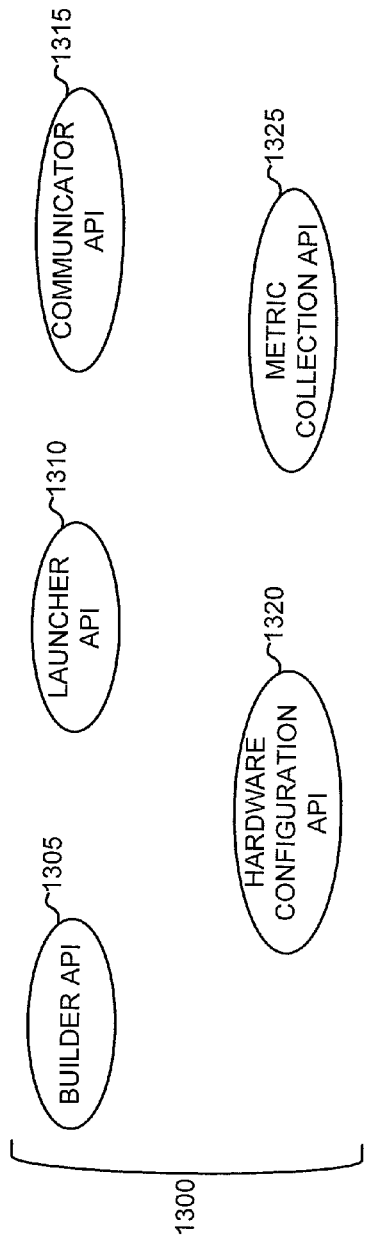
FIG. 13A is a diagram illustrating exemplary functional components of a connectivity application programming interface (API)

FIG. 13A is a diagram illustrating exemplary functional components of a connectivity API 1300. As previously mentioned, connectivity API 1300 may include a number of modular API components, shown as the exemplary set of components: builder API 1305, launcher API 1310, communicator API 1315, hardware configuration API 1320, and metric collection API 1325. Builder API 1305 may be used to configure how TCE 120 and target device 115 handle building/compiling of the model for the particular hardware of the target device. For example, through builder API 1205, a user may provide the compiler that TCE 120 is to use for compiling the model and any options to use when compiling the model. Launcher API 1310 may be used to configure how TCE 120 downloads and initially begins execution of the selected model blocks at target device 115. Communicator API 1315 may be used to configure how TCE 120 and target device 115 communicate. For example, a user may use communicator API 1315 to configure the type of the communication link (e.g., Ethernet, serial communications, etc.) and any drivers needed to support the link. Hardware configuration API 1320 may be used to specify the hardware characteristics of target device 115. Metric collection API 1325 may be used to specify what metrics to collect and how to collect them from target device 115. The metrics may generally relate to the execution of the model at target device 115 and may define execution profiling logic, code coverage logic, and stack profiling logic.

Each API 1305, 1310, 1315, 1320, and 1325 may be used to generate a target connectivity component. A collection of target connectivity components may be registered with TCE 120 as a target connectivity configuration. Each target connectivity component may be independently programmable and can be arbitrarily combined with other target connectivity components to create target connectivity configuration, thus leading to modular connectivity development and code reuse. Advantageously, reduced end-user time may be needed to provide target connectivity for a new target device.

Figure 13B:
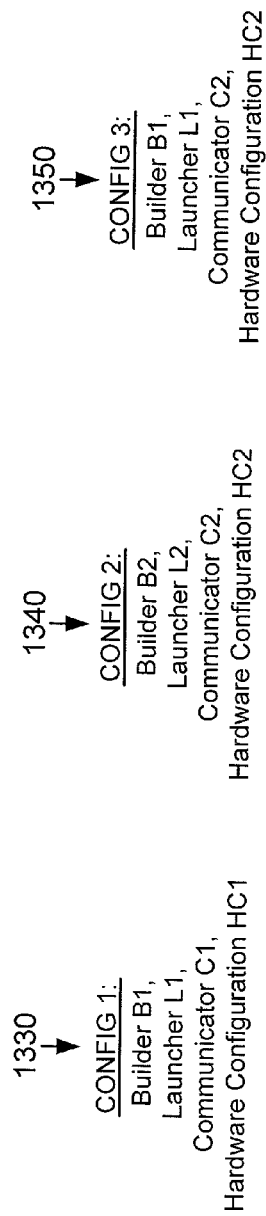
FIG. 13B is a diagram illustrating exemplary configurations for the connectivity API.

FIG. 13B is a diagram illustrating exemplary target connectivity configurations for target devices. In this example, three target connectivity configurations are shown, labeled as target connectivity configurations 1330, 1340, and 1350. Each target connectivity configuration 1330, 1340, and 1350 may include an implementation of builder API 1305, launcher API 1310, communicator API 1315, and hardware configuration API 1320. Target connectivity configuration 1330 includes the builder API "B1," the launcher API "L1," the communication API "C1," and the hardware configuration API "HC1." Similarly, target connectivity configuration 1340 includes the builder API "B2," the launcher API "L2," the communication API "C2," and the hardware configuration API "HC2." Target connectivity configurations 1330 and 1340 may have been created for two different target devices. At some point, however, if a third target device is to be used, where the third target device has hardware characteristics related to building and launching of a model similar to the first target device but other hardware characteristics, such as the communication method of the device, similar to the second target device. The user may use the modular construction of the APIs to assemble target connectivity configuration 1300 which is based on builder API "B1," launcher API "L1," communication API "C2," and hardware configuration API "HC2."

CONCLUSION

Techniques were described herein for performing PIL co-simulation of a model. The PIL co-simulation may be initiated via a "one-click" simulation process. Initial configuration of the host environment for a target device may be performed via a number of modular API connectivity components.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks have been described with regard to FIG. 5, the order of the blocks may be modified in other implementations. Further, non-dependent acts may be performed in parallel.

It will be apparent that embodiments, as described herein, may be implemented in many different forms of software, firmware, and/or hardware in the implementations illustrated in the figures. The actual software code and/or hardware used to implement embodiments described herein is not limiting of the invention. Thus, the operation and behavior of the embodiments were described without reference to the specific software code and/or hardware—it being understood that one would be able to design software and/or hardware to implement the embodiments based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium storing instructions, the instructions comprising:
    one or more instructions, executable by at least one processor, to provide a host environment to facilitate construction of a model of a system,
        the model including a plurality of functional blocks;
    one or more instructions, executable by at least one processor, to receive, via the host environment, information identifying one or more functional blocks, of the plurality of functional blocks of the model, to be simulated by an external target device;
    one or more instructions, executable by at least one processor, to receive a command to start a simulation of the model; and
    one or more instructions, executable by at least one processor, to cause, as part of the simulation of the model and based on receiving the command, the external target device to simulate the one or more functional blocks,
        at least one functional block, of the plurality of functional blocks of the model, being simulated at another device that differs from the external target device.

2. The non-transitory computer-readable medium of claim 1, wherein the one or more instructions to cause the external target device to simulate the one or more functional blocks further include:
    one or more instructions to receive configuration information;
    one or more instructions to select, based on the configuration information, one or more code interfaces of a plurality of code interfaces;
    one or more instructions to associate the one or more functional blocks with the one or more code interfaces; and
    one or more instructions to forward the one or more functional blocks and the associated one or more code interfaces to the external target device.

3. The non-transitory computer-readable medium of claim 1, wherein:
    the one or more functional blocks are associated with a computer code format, and
    the computer code format includes at least one of:
        C,
        C++,
        a hardware descriptor language, or
        a programmable logic controller language.

4. The non-transitory computer-readable medium of claim 1, wherein the one or more instructions to cause the external target device to simulate the one or more functional blocks further include:
   one or more instructions to send data, to the external target device, to schedule simulation, by the external target device, of the one or more functional blocks.

5. The non-transitory computer-readable medium of claim 1, wherein the instructions further comprise:
   one or more instructions to periodically receive results of the external target device simulating the one or more functional blocks;
   one or more instructions to receive the results based on an occurrence of an event associated with simulating the one or more functional blocks by the external target device; or
   one or more instructions to receive the results based on completion of simulating the one or more functional blocks by the external target device.

6. The non-transitory computer-readable medium of claim 1, wherein the one or more instructions to cause the external target device to simulate the one or more functional blocks further include at least one of:
   one or more instructions to provide, to the external target device, data to initiate simulation of the one or more functional blocks by the external target device;
   one or more instructions to modify data provided to the external target device for simulation of the one or more functional blocks;
   one or more instructions to provide, to the external target device, additional data based on receiving, from the external target device, results associated with a partial simulation of the one or more functional blocks by the external target device;
   one or more instructions to provide, to the external target device, a device driver that enables the external target device to interact with the host environment; or
   one or more instructions to enable the one or more functional blocks to be simulated via a real-time operating system (RTOS) associated with the external target device.

7. The non-transitory computer-readable medium of claim 1, wherein the instructions further comprise:
   one or more instructions to determine metrics associated with simulating the one or more functional blocks by the external target device,
      the metrics being associated with at least one of:
         execution profiling identifying a quantity of times that one or more portions of code are executed when simulating the one or more functional blocks by the external target device,
         memory profiling identifying memory usage associated with simulating the one or more functional blocks by the external target device,
         code coverage identifying portions of code used when simulating the one or more functional blocks by the external target device, or
         stack profiling to identify runtime information associated with simulating the one or more functional blocks by the external target device; and
   one or more instructions to present the metrics,
      the one or more instructions to present the metrics further including:
         one or instructions to graphically associate the metrics with the one or more functional blocks.

8. The non-transitory computer-readable medium of claim 7, wherein the one or instructions to graphically associate the metrics with the one or more functional blocks further include:
   one or instructions to graphically associate a particular metric, of the metrics, with at least one of:
      code associated with a particular functional block of the one or more functional blocks,
      a portion of the code associated with the particular functional block, or
      a particular execution of the portion of the code during the simulation of the one or more functional blocks.

9. The non-transitory computer-readable medium of claim 7, wherein the instructions further comprise:
   one or more instructions to receive, using the host environment, information selecting a block of the one or more functional blocks, and
   wherein the metrics are further associated with code for the selected block.

10. The non-transitory computer-readable medium of claim 1, wherein:
   the external target device is included in a plurality of external target devices, and
   the one or more instructions to cause the external target device to simulate the one or more functional blocks further include:
      one or instructions to provide, to the plurality of external target devices, the one or more functional blocks;
      one or instructions to provide respective inputs to the plurality of external target devices; and
      one or instructions to receive, from the plurality of external target devices, respective results associated with simulating the one or more functional blocks using the respective inputs.

11. The non-transitory computer-readable medium of claim 1, wherein the one or more instructions to cause the external target device to simulate the one or more functional blocks further include:
   one or more instructions to cause the external target device to simulate an application call associated with the one or more functional blocks.

12. The non-transitory computer-readable medium of claim 1, wherein the instructions further comprise:
   one or more instructions to receive, from the external target device, information associated with signals that are internal to a component of the one or more functional blocks,
      the signals being associated with simulation of the component by the external target device; and
   one or more instructions to present the information associated with the signals.

13. The non-transitory computer-readable medium of claim 1, wherein the host environment is associated with at least one of:
   a graphical environment, or
   a technical computing environment.

14. The non-transitory computer-readable medium of claim 1, wherein the instructions further comprise:
   one or more instructions to receive, via graphical selection menus associated with the plurality of functional blocks of the model, an indication of the one or more functional blocks to be simulated at the external target device,
      the graphical selection menus being associated with a first graphical view that is different from a second graphical view in which the plurality of functional blocks are displayed.

15. The non-transitory computer-readable medium of claim 1, wherein the one or more instructions to receive the command to start the simulation of the model further include:
one or more instructions to receive information identifying a particular functional block, of the plurality of functional blocks, to be simulated; and
one or more instructions to identify, based on the particular block, another functional block, of the plurality of functional blocks, to be simulated by the external target device.

16. The non-transitory computer-readable medium of claim 1, wherein:
the plurality of functional blocks of the model are hierarchically arranged to include multiple hierarchical levels, and
the one or more functional blocks are from a plurality of the multiple hierarchical levels.

17. The non-transitory computer-readable medium of claim 1, wherein the instructions further comprise:
one or more instructions to compile code associated with the one or more functional blocks; and
one or more instructions to forward the compiled code to the external target device.

18. The non-transitory computer-readable medium of claim 17, wherein the one or more instructions to compile the code associated with the one or more functional blocks further include:
one or more instructions to identify particular blocks, of the one or more functional blocks, that are associated with a previous compilation;
one or more instructions to identify one or more of the particular blocks that have changed since the previous compilation,
other blocks, of the particular blocks, being unchanged since the previous compilation; and
one or more instructions to compile code associated with the one or more of the particular blocks and without compiling code associated with the other blocks.

19. The non-transitory computer-readable medium of claim 17, wherein the one or more instructions to compile the code associated with the one or more functional blocks further include:
one or more instructions to include, in the compiled code, wrapper code that provides an interface between the one or more functional blocks and the host environment.

20. A system comprising:
one or more processors to:
provide a host environment to facilitate construction of a model of a system, the model including a plurality of functional blocks;
receive, via the host environment, information identifying one or more functional blocks, of the plurality of functional blocks of the model, to be simulated by an external target device;
receive a command to start a simulation of the model; and
cause, as part of the simulation of the model and based on receiving the command, the external target device to simulate the one or more functional blocks,
at least one functional block, of the plurality of functional blocks of the model, being simulated at another device that differs from the external target device.

21. The system of claim 20, wherein the one or more processors, when causing the external target device to simulate the one or more functional blocks, are further to:
receive configuration information,
select, based on the configuration information, one or more code interfaces of a plurality of code interfaces,
associate the one or more functional blocks with the one or more code interfaces, and
forward the one or more functional blocks and the associated one or more code interfaces to the external target device.

22. The system of claim 20, wherein:
the one or more functional blocks are associated with a computer code format, and
the computer code format includes at least one of:
C,
C++,
a hardware descriptor language, or
a programmable logic controller language.

23. The system of claim 20, wherein the one or more processors, when causing the external target device to simulate the one or more functional blocks, are further to:
send data, to the external target device, to schedule simulation, by the external target device, of the one or more functional blocks.

24. The system of claim 20, wherein the one or more processors are further to:
periodically receive results from the external target device simulating the one or more functional blocks,
receive the results based on an occurrence of an event associated with simulating the one or more functional blocks by the external target device, or
receive the results based on completion of simulating the one or more functional blocks by the external target device.

25. The system of claim 20, wherein the one or more processors, when causing the external target device to simulate the one or more functional blocks, are further to:
provide, to the external target device, data to initiate simulation of the one or more functional blocks by the external target device,
modify data provided to the external target device for simulation of the one or more functional blocks,
provide, to the external target device, additional data based on receiving, from the external target device, results associated with a partial simulation of the one or more functional blocks by the external target device,
provide, to the external target device, a device driver that enables the external target device to interact with the host environment, or
enable the one or more functional blocks to be simulated via a real-time operating system (RTOS) associated with the external target device.

26. The system of claim 20, wherein the one or more processors are further to:
determine metrics associated with simulating the one or more functional blocks by the external target device,
wherein the metrics are associated with at least one of:
execution profiling identifying a quantity of times that one or more portions of code are executed when simulating the one or more functional blocks by the external target device,
memory profiling identifying memory usage associated with simulating the one or more functional blocks by the external target device,
code coverage identifying portions of code used when simulating the one or more functional blocks by the external target device, or
stack profiling to identify runtime information associated with simulating the one or more functional blocks by the external target device, and graphically associate the metrics with the one or more functional blocks.

27. The system of claim 26, wherein the one or processors, when graphically associating the metrics with the one or more functional blocks, are further to:
graphically associate a particular metric, of the metrics, with at least one of:
code associated with a particular functional block of the one or more functional blocks,
a portion of the code associated with the particular functional block, or
a particular execution of the portion of the code during the simulation of the one or more functional blocks.

28. The system of claim 26, wherein:
the one more processors are further to:
receive, using the host environment, information selecting a block of the one or more functional blocks, and
the metrics are associated with code for the selected block.

29. The system of claim 20, wherein:
the external target device is included in a plurality of external target devices, and
the one or more processors, when causing the external target device to simulate the one or more functional blocks, are further to:
provide, to the plurality of external target devices, the one or more functional blocks,
provide respective inputs to the plurality of external target devices, and
receive, from the plurality of external target devices, respective results associated with simulating the one or more functional blocks using the respective inputs.

30. The system of claim 20, wherein the one or more processors, when causing the external target device to simulate the one or more functional blocks, are further to:
cause the external target device to simulate an application call associated with the one or more functional blocks.

31. The system of claim 20, wherein the one or more processors are further to:
receive, from the external target device, information associated with signals that are internal to a component of the one or more functional block,
the signals being associated with simulation of the component by the external target device, and
present the information associated with the signals.

32. The system of claim 20, wherein the host environment is associated with at least one of:
a graphical environment, or
a technical computing environment.

33. The system of claim 20, wherein:
the one or more processors are further to:
receive, via graphical selection menus associated with the plurality of functional blocks of the model, an indication of the one or more functional blocks to be simulated at the external target device, and
the graphical selection menus are associated with a first graphical view that is different from a second graphical view in which the plurality of functional blocks are displayed.

34. The system of claim 20, wherein the one or more processors, when receiving the command to start the simulation of the model, are further to:
receive information identifying a particular functional block, of the plurality of functional blocks, to be simulated, and
identify, based on the particular block, another functional block, of the plurality of functional blocks, to be simulated by the external target device.

35. The system of claim 20, wherein:
the plurality of functional blocks of the model are hierarchically arranged as multiple hierarchical levels, and
the one or more functional blocks are from a plurality of the multiple hierarchical levels.

36. The system of claim 20, wherein the one or more processors are further to:
compile code associated with the one or more functional blocks, and
forward the compiled code to the external target device.

37. The system of claim 36, wherein the one or more processors, when compiling the code associated with the one or more functional blocks, are further to:
identify particular blocks, of the one or more functional blocks, included in another compilation,
determine that one or more of the particular blocks have changed since the other compilation,
other blocks, of the particular blocks, being unchanged since the other compilation, and
compile code associated with the one or more of the particular blocks without compiling code associated with the other blocks.

38. The system of claim 36, wherein the one or more processors, when compiling the code associated with the one or more functional blocks, are further to:
include, in the compiled code, wrapper code that provides an interface between the one or more functional blocks and the host environment.

39. A method comprising:
providing a host environment to facilitate construction of a model of a system,
the model including a plurality of functional blocks;
receiving, via the host environment, information identifying one or more functional blocks, of the plurality of functional blocks of the model, to be simulated by an external target device;
receiving a command to start a simulation of the model; and
causing, as part of the simulation of the model and based on receiving the command, the external target device to simulate the one or more functional blocks,
at least one functional block, of the plurality of functional blocks of the model, being simulated at another device that differs from the external target device, and
the providing, the receiving of the information, the receiving of the command, and the causing being performed by one or more processors.

40. The method of claim 39, wherein causing the external target device to simulate the one or more functional blocks further includes:
receiving configuration information;
selecting, based on the configuration information, one or more code interfaces of a plurality of code interfaces;
associating the one or more functional blocks with the one or more code interfaces; and
forwarding the one or more functional blocks and the associated one or more code interfaces to the external target device.

41. The method of claim 39, wherein causing the external target device to simulate the one or more functional blocks further includes:
sending data, to the external target device, to schedule simulation, by the external target device, of the one or more functional blocks.

42. The method of claim 39, further comprising at least one of:
- receiving, periodically from the external target device, results associated with simulating the one or more functional blocks;
- receiving the results based on an occurrence of an event associated with simulating the one or more functional blocks by the external target device; or
- receiving the results based on completion of simulating the one or more functional blocks by the external target device.

43. The method of claim 39, wherein causing the external target device to simulate the one or more functional blocks includes at least one of:
- providing, to the external target device, data to initiate simulation of the one or more functional blocks by the external target device;
- modifying data provided to the external target device for simulation of the one or more functional blocks;
- providing, to the external target device, additional data based on receiving, from the external target device, results associated with a partial simulation of the one or more functional blocks by the external target device;
- providing, to the external target device, a device driver that enables the external target device to interact with the host environment; or
- enabling the one or more functional blocks to be simulated via a real-time operating system (RTOS) associated with the external target device.

44. The method of claim 39, further comprising:
determining metrics associated with simulating the one or more functional blocks by the external target device,
the metrics being associated with at least one of:
- execution profiling identifying a quantity of times that one or more portions of code are executed when simulating the one or more functional blocks by the external target device,
- memory profiling identifying memory usage associated with simulating the one or more functional blocks by the external target device,
- code coverage identifying portions of code used when simulating the one or more functional blocks by the external target device, or
- stack profiling to identify runtime information associated with simulating the one or more functional blocks by the external target device; and graphically associating the metrics with the one or more functional blocks,
wherein graphically associating the metrics with the one or more functional blocks includes:
graphically associating a particular metric, of the metrics, with at least one of:
- code associated with a particular functional block of the one or more functional blocks,
- a portion of the code associated with the particular functional block, or
- a particular execution of the portion of the code during the simulation of the one or more functional blocks.

* * * * *